(12) United States Patent
Lutnick et al.

(10) Patent No.: US 10,672,073 B2
(45) Date of Patent: *Jun. 2, 2020

(54) SYSTEMS AND METHODS FOR PROVIDING A TRADING INTERFACE WITH ADVANCED FEATURES

(71) Applicant: BGC PARTNERS, INC., New York, NY (US)

(72) Inventors: Howard W. Lutnick, New York, NY (US); Glenn T. Kirwin, Scarsdale, NY (US); Andrew C. Gilbert, Califon, NJ (US)

(73) Assignee: BGC PARTNERS, INC., New York, NY (US)

(*) Notice: Subject to any disclaimer, the term of this patent is extended or adjusted under 35 U.S.C. 154(b) by 348 days.

This patent is subject to a terminal disclaimer.

(21) Appl. No.: 15/633,046

(22) Filed: Jun. 26, 2017

(65) Prior Publication Data

US 2017/0308955 A1    Oct. 26, 2017

Related U.S. Application Data

(60) Continuation of application No. 11/228,604, filed on Sep. 16, 2005, now Pat. No. 9,721,297, which is a
(Continued)

(51) Int. Cl.
*G06Q 40/00* (2012.01)
*G06Q 40/04* (2012.01)
*G06Q 30/06* (2012.01)

(52) U.S. Cl.
CPC ......... *G06Q 40/04* (2013.01); *G06Q 30/0633* (2013.01); *G06Q 40/00* (2013.01)

(58) Field of Classification Search
USPC ........................................... 705/35
See application file for complete search history.

(56) References Cited

U.S. PATENT DOCUMENTS

| | | |
|---|---|---|
| 3,573,747 A | 4/1971 | Adams et al. |
| 3,976,840 A | 8/1976 | Cleveland et al. |
| | (Continued) | |

FOREIGN PATENT DOCUMENTS

| | | |
|---|---|---|
| EP | 0412308 | 2/1991 |
| EP | 0512702 | 11/1992 |
| | (Continued) | |

OTHER PUBLICATIONS

Datadesk's User-Configurable Keyboard Allows Users to Customize Layout, Add Input Devices. Jaker, Claudia, Brehm, Michaela. Business Wire. New York: Apr. 3, 1990. Sec. 1. p. 1.*
(Continued)

*Primary Examiner* — Olabode Akintola

(57) ABSTRACT

Systems and methods for a trading interface with advanced features are provided. Using these systems and methods, a user may create orders, manipulate orders, cancel orders, configure alternative keyboard settings, and/or obtain additional information on transactions. When a user clicks on a bid and/or offer, a dialog box may pop-up, thereby providing the user with multiple options. To enable customization of the keyboard settings to a user's preference, a keyboard settings feature is provided. Users may also be provided with additional information relating to the user's wish to transact.

20 Claims, 11 Drawing Sheets

Related U.S. Application Data division of application No. 10/147,269, filed on May 14, 2002, now abandoned.

(60) Provisional application No. 60/290,719, filed on May 14, 2001.

(56) References Cited

U.S. PATENT DOCUMENTS

| | | |
|---|---|---|
| 4,551,717 A | 11/1985 | Dreher |
| 4,906,117 A | 3/1990 | Birdwell |
| 5,101,353 A | 3/1992 | Lupien et al. |
| 5,168,446 A | 12/1992 | Wiseman |
| 5,243,331 A | 9/1993 | McCausland et al. |
| 5,253,940 A | 10/1993 | Abecassis |
| 5,297,031 A | 3/1994 | Gutterman et al. |
| 5,297,032 A | 3/1994 | Trojan et al. |
| 5,387,042 A | 2/1995 | Brown |
| 5,463,547 A | 10/1995 | Markowitz et al. |
| 5,667,319 A | 9/1997 | Satloff |
| 5,724,524 A | 3/1998 | Hunt et al. |
| 5,809,483 A | 9/1998 | Broka et al. |
| 5,845,266 A | 12/1998 | Lupien et al. |
| 5,870,449 A | 2/1999 | Lee et al. |
| 5,870,724 A | 2/1999 | Lawlor et al. |
| 5,905,974 A | 5/1999 | Fraser et al. |
| 6,058,379 A | 5/2000 | Odom et al. |
| 6,064,981 A | 5/2000 | Barni et al. |
| 6,134,535 A | 10/2000 | Belzberg |
| 6,317,727 B1 | 11/2001 | May |
| 6,344,859 B1 | 2/2002 | Alimpich et al. |
| 6,473,744 B1 * | 10/2002 | Tuck .............. G06Q 50/00 700/286 |
| 6,560,580 B1 | 5/2003 | Fraser et al. |
| 6,734,806 B1 | 5/2004 | Cratsley, III |
| 6,850,907 B2 | 2/2005 | Lutnick et al. |
| 6,903,662 B2 | 6/2005 | Rix et al. |
| 6,912,126 B2 | 6/2005 | Rudd et al. |
| 11,228,604 | 9/2005 | Lutnick et al. |
| 11,229,107 | 9/2005 | Lutnick et al. |
| 6,963,856 B2 | 11/2005 | Lutnick et al. |
| 6,965,511 B2 | 11/2005 | Rudd et al. |
| 6,993,504 B1 * | 1/2006 | Friesen ........... G06Q 20/10 705/36 R |
| 7,157,651 B2 | 1/2007 | Rix et al. |
| 7,197,228 B1 | 3/2007 | Monroe et al. |
| 7,212,999 B2 * | 5/2007 | Friesen ........... G06Q 20/10 345/440.2 |
| 7,229,007 B1 * | 6/2007 | Swaine ........... G06Q 20/1085 235/379 |
| 7,283,067 B2 | 10/2007 | Lutnick et al. |
| 7,400,270 B2 | 7/2008 | Lutnick et al. |
| 7,865,422 B2 | 1/2011 | Lutnick et al. |
| 10,147,269 B2 | 12/2018 | Chun |
| 2002/0063691 A1 * | 5/2002 | Rogers .............. G06F 3/0219 345/168 |
| 2002/0120551 A1 * | 8/2002 | Jones, III ............. G06Q 40/04 705/37 |
| 2003/0004862 A1 | 1/2003 | Lutnick et al. |
| 2003/0023952 A1 | 1/2003 | Harmon |
| 2004/0218963 A1 | 11/2004 | Van Diepen et al. |
| 2006/0015434 A1 | 1/2006 | Lutnick et al. |
| 2006/0080225 A1 | 4/2006 | Lutnick et al. |

FOREIGN PATENT DOCUMENTS

| | | |
|---|---|---|
| EP | 0678792 | 10/1995 |
| EP | 0 993 995 | 4/2000 |
| EP | 0 733 963 | 9/2005 |
| GB | 2 256 954 | 12/1992 |
| JP | 11-25158 | 1/1999 |
| WO | WO 85/04271 | 9/1985 |
| WO | WO 87/03115 | 5/1987 |
| WO | WO 98/49639 | 11/1998 |
| WO | WO 01/16852 | 3/2001 |
| WO | WO 01/22313 | 3/2001 |

OTHER PUBLICATIONS

EPO Communication including European Search Report for Application No. EP 02 25 3377, dated Nov. 30, 2004.

ITunes, at http://guides.macrumors.comlimages/thumb/c/c8/i"Funes_1_0S9.jpg/800px-ITunes_1_0S9.jpg (iTunes version 1.0 released Jan. 9, 2001).

ITunes, at http://guides.macrumors.com/images/thumb/4/43liTunes_1.1.jpg/800px-ITunes_1.1.jpg (iTunes version 1.0 released Jan. 9, 2001).

International Search Report for International Application No. PCT/US2002/018538, dated May 7, 2003 (1 page).

International Preliminary Examination Report for International Application No. PCT/US2002/018538, dated Feb. 2, 2004 (3 pages).

Enabling the "Disabled": Technologies for People with Handicaps. Wagner, Cynthia G. The Futurist. Washington: May/Jun. 1992. vol. 26, Iss. 3; p. 29, 4.

Datadesk Ships Switchboard; First User-Configurable Keyboard for Both IBM PCs and Macintosh Computers, Allows Users to Customize Keyboard, Add Input Devices. Brehm, Michaela, Jaker, Claudia. Business Wire. New York: Jun. 26, 1990. Sec. 1. p. 1.

* cited by examiner

| ITEM | BID PRICE | BID SIZE | OFFER PRICE | OFFER SIZE | WHAT'S SAID |
|---|---|---|---|---|---|
| 1 YR BOND | 101.25 | 25 | 101.20 | 20 | 504 ↑ — GREEN |
| 2 YR BOND | 101.20 | 25 | 101.25 | 20 | 506 ↓ — GREEN |
| 5 YR BOND | 101.25 | 20 | 101.20 | 25 | 508 ↑ — RED |
| 10 YR BOND | 101.20 | 20 | 101.25 | 25 | 510 ↓ — RED |
| 20 YR BOND | | | 101.20 | 20 | 512 ↑ — YELLOW |
| 30 YR BOND | 101.20 | 20 | | | 514 ↓ — YELLOW |

| SYMBOL | CINERGY | COM ED | ENTERGY | TVA | PJM | NY ZONE AGJ | NP15 | SP15 | PALO VERDE | ENERGY | | LAST PRICE | LAST SIZE | LAST TIME |
|---|---|---|---|---|---|---|---|---|---|---|---|---|---|---|
| | | | | | BID⊗ | ALL MARKETS | | | OFFER⊗ | | | | | |
| PJM_P_Q4_01 | LIFT | ⊕ | ⊕ | ⊕ | BID | | | | OFFER | HIT | | 100.30 | 50 | 13:52:55 |
| PJM_P_JUL_02-AUG_02 | LIFT | ⊕ | ⊕ | ⊕ | X | 99.60 – 99.60 | 50x50 | | X | HIT | ⊕ | 98.95 | 50 | 14:36:02 |
| NYM_F_NOV_01-MAR_02 | LIFT | ⊕ | ⊕ | ⊕ | BID | | | | OFFER | HIT | | 50.00 | 50 | 15:28:12 |
| NYM_F_APR_02-OCT_02 | LIFT | ⊕ | ⊕ | ⊕ | X | 2.21 – 2.21 | 0.5x0.5 | | X | HIT | ⊕ | 6.24 | 0.5 | 20:08:27 |
| NYM_F_CAL_02 | LIFT | ⊕ | ⊕ | ⊕ | X | 3.25 – 3.25 | 0.5x0.5 | | X | HIT | ⊕ | 8.00 | 10 | 15:33:47 |
| PRB-8400_P_Q4_01 | LIFT | ⊕ | ⊕ | ⊕ | BID | | | | OFFER | HIT | | | | |
| PRB-8400_P_Q3_02 | LIFT | ⊕ | ⊕ | ⊕ | X | 6.30 – | 1x | | OFFER | HIT | ⊕ | | | |
| PRB-8400_P_CAL_02 | LIFT | ⊕ | ⊕ | ⊕ | BID | | | | OFFER | HIT | | | | |
| OTC-NOxP_V00 | LIFT | ⊕ | ⊕ | ⊕ | X | 575.00 – 575.00 | 1x1 | | X | HIT | ⊕ | 50.00 | 1 | 11:34:04 |
| OTC-NOxP_V01 | LIFT | ⊕ | ⊕ | ⊕ | X | 750.00 – 750.00 | 1x1 | | X | HIT | ⊕ | 0.01 | 1000 | 16:24:11 |
| OTC-NOxP_V02 | LIFT | ⊕ | ⊕ | ⊕ | BID | | | | OFFER | HIT | | | | |

FIG. 7

| SYMBOL | CINERGY | COM ED | ENTERGY | TVA | RJM | NY ZONE AGJ | NP15 | SP15 | PALO VERDE | ENERGY | | LAST PRICE | LAST SIZE | LAST TIME |
|---|---|---|---|---|---|---|---|---|---|---|---|---|---|---|
| | | | | | BID⊗ | ALL MARKETS | | | OFFER⊗ | | | | | |
| PJM_P_JUL_02-AUG_02 | LIFT | ⊕ | ⊕ | ⊕ | X | 99.70 – 99.90 | 100x50 | | X | HIT | ⊕ | 99.85 | 50 | 16:08:08 09/04/01 |
| | LIFT | ⊕ | ⊕ | ⊕ | JOIN | 99.65 – 100.00 | 50x50 720 | | JOIN | HIT | ⊕ 702 | | | |
| | LIFT | ⊕ | ⊕ | ⊕ | JOIN | 99.60 – 100.05 | 50x150 | | JOIN | HIT | ⊕ | | | |
| | LIFT | ⊕ | ⊕ | ⊕ | JOIN | 99.55 – 100.10 | 50x50 | | JOIN | HIT | ⊕ | | | |
| | LIFT | ⊕ | ⊕ | ⊕ | JOIN | 99.50 – | 50x | | OFFER | HIT | ⊕ | | | |
| NYM_F_NOV_01-MAR_02 | LIFT | ⊕ | ⊕ | ⊕ | X | 3.05 – 3.05 | 0.5x0.5 | | X | HIT | ⊕ | 40.00 | 50 | 10:38:26 09/04/01 |
| | LIFT | ⊕ | ⊕ | ⊕ | JOIN | 3.0475 – 3.055 | 0.5x0.5 | | JOIN | HIT | ⊕ | | | |
| | LIFT | ⊕ | ⊕ | ⊕ | JOIN 716 | 3.045 – 3.0575 | 0.5x0.5 | | JOIN | HIT | ⊕ | | | |
| | LIFT | ⊕ | ⊕ | ⊕ | JOIN | 3.0425 – 3.0625 | 0.5x0.5 | | JOIN | HIT | ⊕ | | | |
| | LIFT | ⊕ | ⊕ | ⊕ | JOIN | 3.0375 – 3.065 | 0.5x0.5 | | JOIN | HIT | ⊕ | | | |
| NYM_F_CAL_02 | LIFT | ⊕ | ⊕ | ⊕ | X | 2.745 – 2.755 | 0.5x1 | | X | HIT | ⊕ | 2.752 | 0.5 | 16:08:26 09/04/01 |
| | LIFT | ⊕ | ⊕ | ⊕ | JOIN | 2.7425 – 2.7575 | 1x0.5 | | JOIN | HIT | ⊕ | | | |
| | LIFT | ⊕ | ⊕ | ⊕ | JOIN | 2.74 – 2.76 | 0.5x0.5 | | JOIN | HIT | ⊕ | | | |
| | LIFT | ⊕ | ⊕ | ⊕ | BID | 2.7375 – | 0.5x | | OFFER | HIT | ⊕ | | | |

| STATUS | TYPE △ | SIZE | INST NAME | PRICE/RATE | TIME | COMMENTS | TRADE REF# | COUNTERPARTY NA. | USER NAME |
|---|---|---|---|---|---|---|---|---|---|
| ACCEPTED | OFFER [LIMIT] | 0.5 | NYM_F_CAL_02 | 3.2725 | 16:35:47 08/30 | | | | SPARK 39 |
| ACCEPTED | OFFER [LIMIT] | 0.5 | NYM_F_NOV_01-MAR | 4.0075 | 16:35:47 08/30 | | | | SPARK 39 |
| ACCEPTED | OFFER [LIMIT] | 1 | PRB-8400_P_Q3_02 | 6.80 | 16:35:48 08/30 | | | | SPARK 39 |
| ACCEPTED | OFFER [LIMIT] | 50 | PJM_P_Q4_01 | 100.45 | 16:35:48 08/30 | | | | SPARK 39 |
| ACCEPTED | OFFER [LIMIT] | 50 | OTC-NOxP_V00 | 625.00 | 16:35:48 08/30 | | | | SPARK 39 |
| ACCEPTED | OFFER [LIMIT] | 50 | OTC-NOxP_V01 | 825.00 | 16:35:49 08/30 | | | | SPARK 39 |

Tabs: ACTIVE ORDERS | TRADE HISTORY | MARKET HISTORY | SUSP MKTS (902, 904, 906, 908, 910)

SPARK39 OTC-NOxP_V01, MARKET CANCELLED: OFFER 50 AT 825.00 [LIMIT]: MARKET CANCELLED BY SYSTEM...[CUSTOM KEYBOARD DISA]SPARK 39

SUSPENDED MARKETS — 956
- SUSPENDED MARK ▽
- REMOVE
- RESTORE
- PRICE UP / PRICE DOWN / DEFAULT — 954
- PRICE TICK:
- SIZE UP / SIZE DOWN / DEFAULT — 960
- SIZE TICK: — 958
- 950, 952

FIG. 10

FXSP POSTING | FXSPT POSTING | FXSPOT POSTING | FXSP XX | FXSPT XX | FXSPOT XX | GRID 6 | GRID 7

| SYMBOL | MARKET | | | | | | ALL MARKET |
|---|---|---|---|---|---|---|---|
| AUD/USD_SP | HIT | | | | | | |
| EUR/USD_SP | HIT | | | | | | |
| GBP/USD_SP | HIT | | | | | | |
| USD/JPY_SP | HIT | | | | | | |
| USD/CAD_SP | HIT | 1.5701- | 1x | | | | 1.5701- 1x |
| EUR/GBP_SP | HIT | | | | | | |
| EUR/JPY_SP | HIT | | | | | | |
| USD/CHE_SP | HIT | | | | | | |
| USD/HKD_SP | HIT | | | | | | |
| USD/NOK_SP | HIT | | | | | | |
| USD/SEK_SP | HIT | | | | | | |

CANCEL? — 1000
CANCEL THE FOLLOWING MARKET/ORDER:
USD/CAD_SP [USD/CAD_SP]: BID 1 AT 1.5701
[YES] [NO]

USD CF-INDICATIVE | MMTS 515 | MMTS 520 | U.S. TREASURY ODD LOTS

ACTIVE ORDERS | TRADE HISTORY | MARKET HISTORY | SUSP MKTS

| STATUS | TYPE | SIZE | INST NAME | PRICE/RATE | TIME | COMMENTS | TRADE REF# | COUNTERPARTY NAME |
|---|---|---|---|---|---|---|---|---|
| ACCEPTED | BID | 1 | USD/CAD_SP | 1.5701 | 10:15:51 05/09 | OK BID 1 @ 1.57010 ACCEPTED! | | |

SYSTEMS AND METHODS FOR PROVIDING A TRADING INTERFACE WITH ADVANCED FEATURES

CROSS-REFERENCE TO RELATED APPLICATION

This application is a continuation of U.S. patent application Ser. No. 11/228,604 filed on Sep. 16, 2005 which is a division of U.S. patent application Ser. No. 10/147,269, filed May 14, 2002 and claims the benefit of U.S. provisional application No. 60/290,719, filed May 14, 2001, all both of which applications are hereby incorporated by reference herein in their entireties.

BACKGROUND OF THE INVENTION

This invention relates to systems and methods for providing a trading interface. More particularly, this invention relates to systems and methods for providing a trading interface with advanced features.

Electronically based trading systems have gained widespread popularity in recent years. Such trading systems are frequently used for trading items ranging from financial instruments (such as stocks, bonds, currency, futures contracts, etc.) to household goods (such as old records, antiques, wines, etc.). In many of these trading systems, bid/offer-hit/take processes are used to negotiate a sale of a given item. In connection with such processes, bids and/or offers for items are entered into a trading system and a hit or take is submitted in response to a bid or an offer, respectively, to agree to a sale.

Today, these trading systems are being developed with advanced processing circuitry and sufficient memory to support new types of software applications not previously envisioned. A challenge created by the new types of software applications is the ability to offer advanced features consistent with users' expectations of a trading interface environment. Advanced trading systems may provide features that to improve a user's efficiency, speed, and accuracy.

In view of the foregoing, it would be desirable to provide enhanced features and applications for a trading interface environment.

SUMMARY OF THE INVENTION

In accordance with this and other objects of the invention, systems and methods provide trading interfaces with advanced features. More particularly, in accordance with this invention, the user can use various trading interfaces to create orders, manipulate orders, cancel orders, configure alternative keyboard settings, and obtain additional information on transactions.

The bids and/or offers may be inputted via the trading interface. Users may use a keyboard and/or mouse to navigate through the trading interface. An example of a trading interface is discussed in Kirwin et al. U.S. patent application Ser. No. 09/745,651, filed Dec. 22, 2000, which is hereby incorporated by reference herein in its entirety.

The bids and/or offers may be manipulated with a mouse-based interface. If a user clicks on a bid and/or offer, a dialog box may pop-up, thereby providing the user with multiple options. The dialog box may allow the user to cancel an order if necessary or edit an order and change the prices or sizes.

In another approach, bids and/or offers may be edited with a keyboard. A user may highlight one or more bids and/or offers. The user may adjust the prices up and down by pressing the page up and page down keys. The user may also press the left and right arrows to decrease and increase the size amount.

To enable customization of the keyboard settings to a user's preference, a keyboard settings feature is provided. This feature may allow users to configure the keyboard as they wish and save their settings as separate keyboard settings. A user may switch to his or her preferred keyboard setting by clicking through tabs of multiple saved keyboard configurations.

Users may also be provided with additional information relating to the last transacted price (e.g., bid or offer price). Instead of the conventional combination of arrow color and direction representing the direction of the market, the user may be provided with such a combination representing whether a buyer or a seller wishes to place bids and/or offers.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 5-7 are illustration of a trading summary windows that may be generated in accordance with certain embodiments of the present invention.

FIGS. 9 and 10 are illustrations of an active orders windows that may be generated in accordance with certain embodiments of the present invention.

DETAILED DESCRIPTION OF THE PREFERRED EMBODIMENTS

FIGS. 1-10 are illustrative examples of screen displays that may be presented in certain embodiments of the present invention. It should be noted that the interfaces presented here are only for illustrative purposes and various features, within the scope of the invention, may be added to or removed from the interfaces. Furthermore, for the purpose of clarity, and not by way of limitation, the displays, techniques, or methods herein are demonstrated primarily in the context of financial instruments.

Systems and methods for providing a trading interface are also described in, for example, the above-mentioned Kirwin et al. U.S. patent application Ser. No. 09/745,651, filed Dec. 22, 2000. As discussed, a user may bid for, offer to sell, buy, and/or sell an item by submitting a trading command indicating the action to be taken using various approaches. The user may submit the trading command by using a keyboard to input a command-line interface, by using a mouse with a graphical interface, a combination of the two, or any other suitable approach.

When the user has finished creating an order, the user may be presented with a trading summary display screen 100. Display screen 100 may include existing orders 102 comprising one or more bids and/or offers made by the user. For example, display screen 100 shows the user's active and suspended bids on "U.S. Treasury Bonds" (e.g., 1 year bond, 2 year bond, 5 year bond, etc.). Display 100 may also include the item, the size, the price, and the status for each bid. As shown in display 100, existing bids may receive a status of suspended or active.

Figure 1:
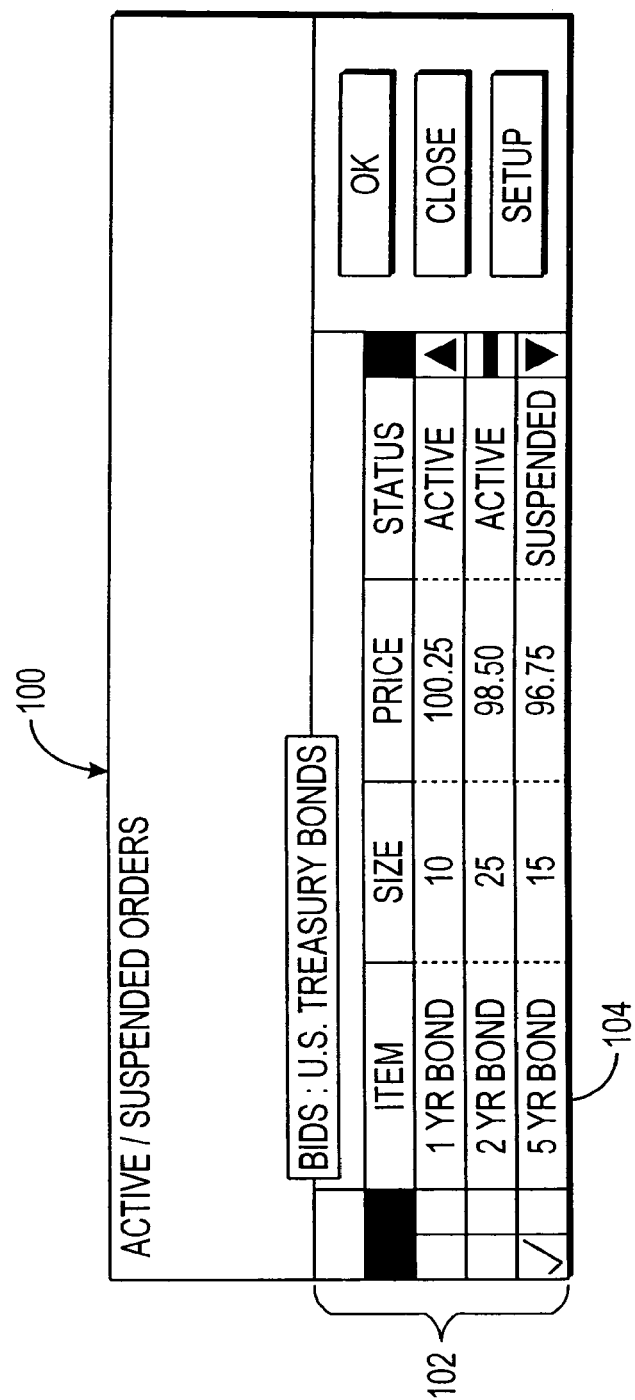
FIG. 1 is an illustration of a trading interface that may be generated in accordance with certain embodiments of the present invention.

To efficiently manipulate orders, the present invention preferably includes a feature that provides multiple editing options to the user. In accordance with this feature, for example, when a user clicks on a bid 104 (e.g., 5 year bond as depicted in FIG. 1) in trading summary display screen 100, a dialog window 200 may pop-up. Dialog window 200, however, may already be open. In this embodiment, the user may cancel the bid, edit the bid, and change the prices and/or sizes. Alternately, the user may click on multiple bids and multiple dialog windows may pop-up.

In another approach, when a user edits active and/or suspended orders with a keyboard, the user may select a bid 104 such that dialog window 200 pops-up. The user may adjust the price up and down, for example, by pressing the "page up" and "page down" keys on the keyboard, respectively. The user may press, for example, the left arrow and right arrow keys to decrease and increase the size of the bid, respectively. Multiple bids may be selected and altered simultaneously.

Figure 2:
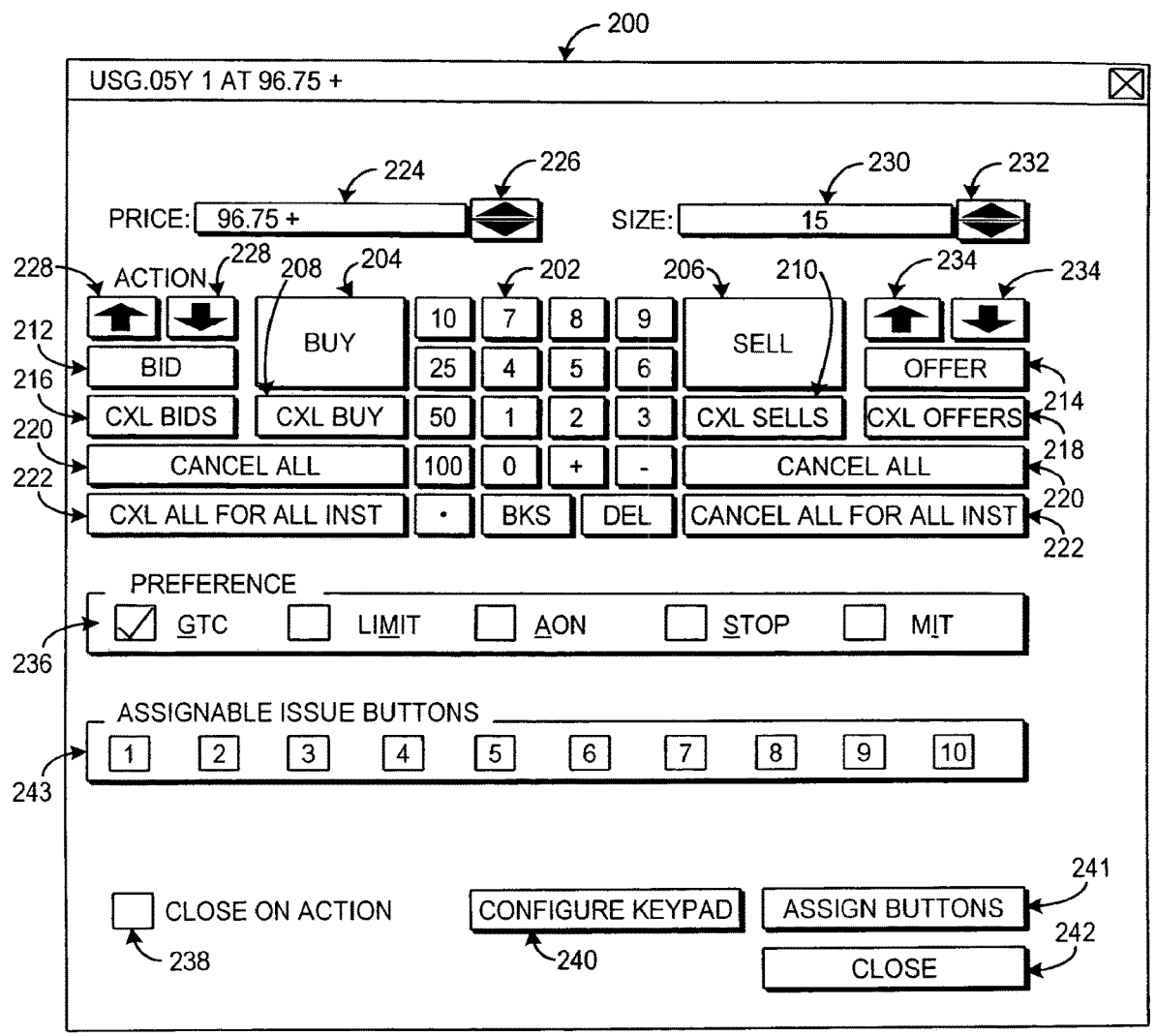
FIG. 2 is an illustration of a dialog window that may be generated in accordance with certain embodiments of the present invention.

As shown in FIG. 2, the graphical interface comprises a dialog window 200 with various buttons and entry fields 202-242. Using these buttons and entry fields, a user may edit a bid command, an offer command, a buy command, or a sell command for an item corresponding to a trading summary display screen 100. Preferably, each traded item uses a unique dialog window 200. Dialog window 200 may be opened automatically and/or manually before, during, and/or after a trade, and may allow a user to submit a trade command at any time. The dialog window may be repositioned on a user's display and/or fixed in place. The number of dialog windows 200 that can be kept open at any one time is preferably unlimited.

As shown in FIG. 2, dialog window 200 may comprise a variety of on-screen buttons and entry fields. Generally, a button, as displayed in box 200, may be "pushed" by placing a pointing device's pointer over the button and pressing a switch on the pointing device, as is commonly known in the art. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all buttons 220, cancel all for all instruments button 222, a price entry field 224, price up and down buttons 226, bid price up and down buttons 228, offer price up and down buttons 234, a size entry field 230, and size up and down buttons 232. Finally, dialog window 200 may contain a preference field 236 that allows a user to specify preferred types of orders, a close-on-action box 238 that causes dialog window 200 to be automatically closed after specified actions are performed, a configure keypad button 240 that allows a user to arrange the keypad for dialog window 200, a close button 242 that closes the dialog window 200 on demand, and an assign buttons button 241 that allows a user to define alternative keyboard settings.

Dialog window 200 may also include assignable issue buttons 243. Assignable issue buttons 243 may allow a user to select the user's preferred keyboard settings. Assignable issue buttons 243 may correspond to a previously configured keyboard setting. For example, a "1" button may correspond to the first set of keyboard settings. Multiple keyboard settings may be configured by selecting the assign buttons button 241 (to be discussed in further detail below).

Preference field 236 may be used to indicate the user's preferred trade type and may allow the user to select any type of trade that a particular exchange or trading system supports. Although FIG. 2 provides specific examples of trade types (e.g., good-till-canceled (GTC), limit, all-or-none (AON), stop, and market-if-touched (MIT)), the invention may be implemented with any type of trade.

Configure keypad button 240 may allow a user to arrange buttons appearing in dialog window 200 to be anywhere a user prefers by first pressing the configure keypad button 240, by then dragging the buttons to new positions, and finally by clicking on button 240 again. Also, the configuration or re-configuration of buttons can change the function of those buttons depending on the type of trading desired or what type of item is being traded.

Figure 3:
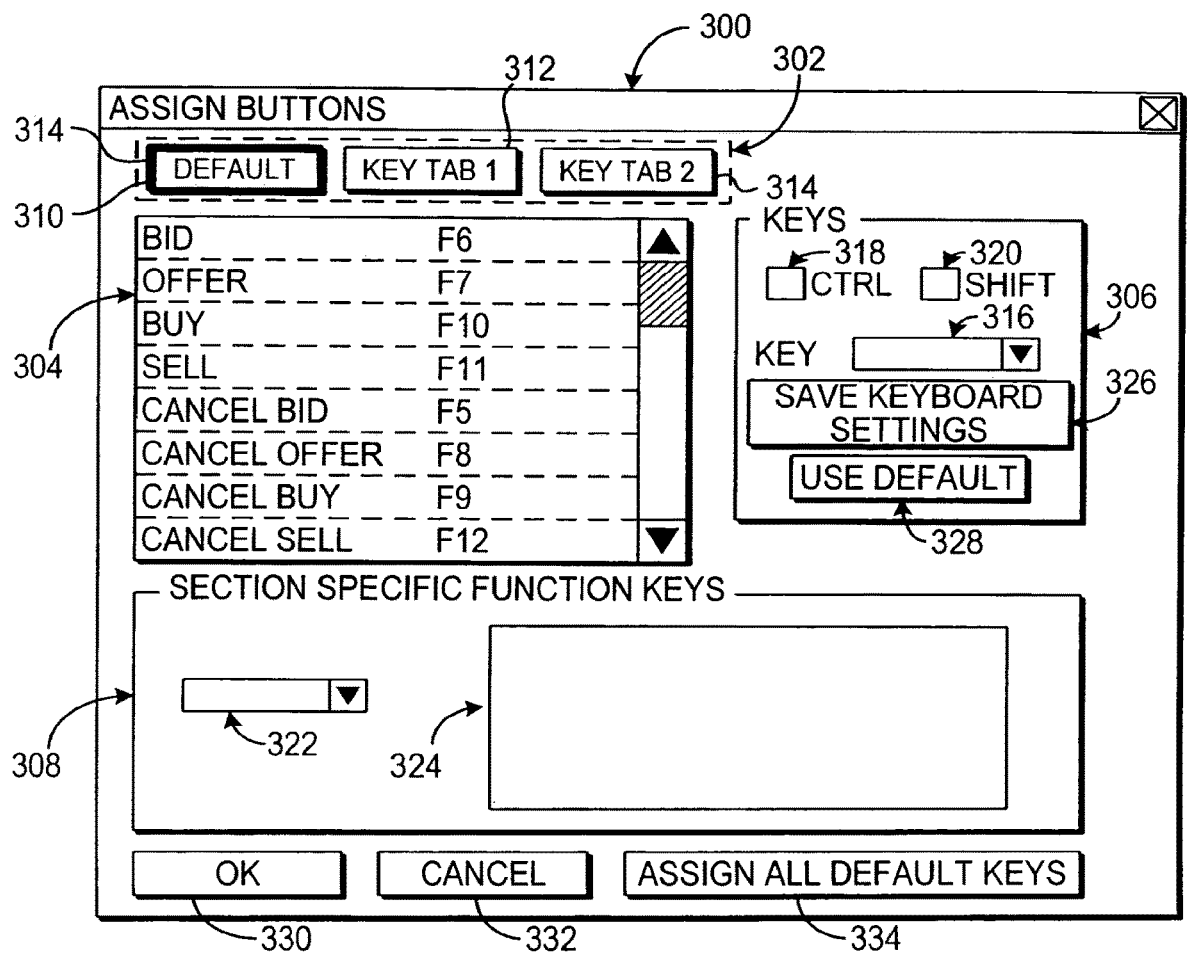
FIGS. 3 and 4 are illustrations of keyboard settings windows that may be generated in accordance with certain embodiments of the present invention.

Assign buttons button 241 may allow a user to configure the keyboard and save the user's preferred settings as an alternate keyboard setting, while retaining the default keyboard setting. Once the user clicks on the assign buttons button 241, the user may be presented with assign buttons window 300 as shown in FIG. 3. Assign buttons window 300 may include saved settings tabs 302, settings list 304, key assigning menu 306, and specific function keys menu 308.

Saved settings tabs 302 may allow a user to select a saved keyboard configuration. As shown, the user may select "Default" tab 308, "Key Tab 1" tab 310, or "Key Tab 2" tab 312. As shown by highlight 314, the user has selected the "Default" tab 308. It should be noted that the number of tabs 302 that the user may select is preferably unlimited.

Settings list 304 may provide the user with the capability to view a list of saved function keys. That is, the user may scroll through settings list 304 to view the key assigned to a particular function. For example, settings list 304 shows that the "Bid" function may be executed by pressing "F6" on the keyboard. Settings list 304 may be updated periodically (e.g., after every key assigned, once "OK" button 330 is pressed, etc.)

Figure 4:
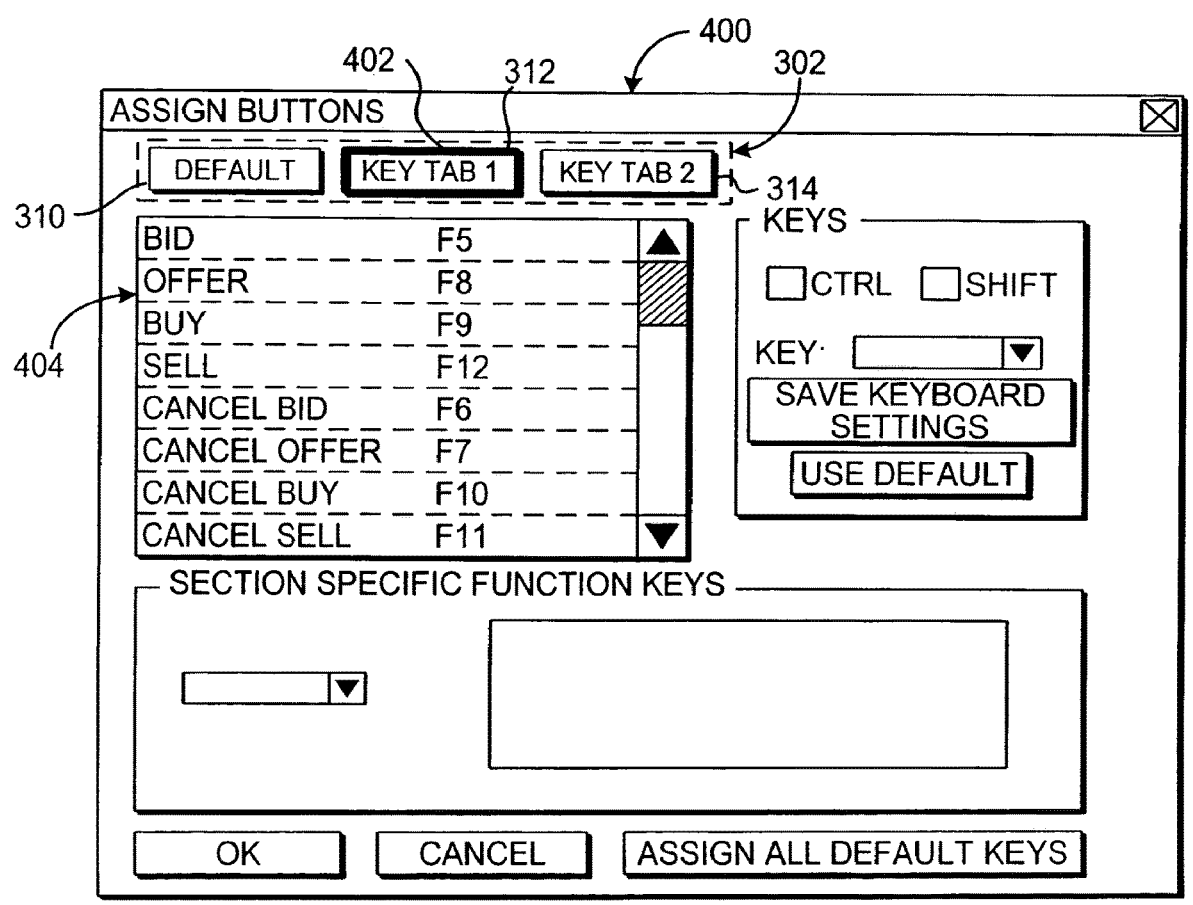

Now referring to FIG. 4, when the user selects another saved settings tab, the user may be presented with assign buttons window 400. As shown, the user selected "Key Tab 1" by highlighting the appropriate tab 312. Assign buttons window 400 may provide the user with a settings list 404 that shows the command functions paired with keyboard settings corresponding to tab 312.

Now referring back to FIG. 3, key assigning menu 306 may allow a user to configure the keyboard and save the keyboard setting. Key assigning menu 306 may include a key list 316, a "Ctrl" box 318, and a "Shift" box 320. Key list 316, if selected, may provide the user with a drop-down menu of multiple keys on the keyboards. When the user selects "Ctrl" box 318, the user may perform the associated function by pressing the "Ctrl" key on the keyboard in combination with the key chosen in key list 316. For example, the user may wish to execute the "Buy" function when the user presses the "Ctrl" key and the "B" key simultaneously on the keyboard. Similarly, when the user selects "Shift" box 318, the user may perform the associated function by pressing the "Shift" key on the keyboard in combination with the key chosen in key list 316.

The one or more keys selected in key assigning menu 306 may correspond to the function chosen in specific function keys menu 308. Specific function keys menu 308 may include functions list 322 and previous settings list 324. Functions list 322, if selected, may provide the user with a drop-down menu of pre-defined functions (e.g., buy, sell, cancel bid, cancel offer, etc.). Once the user selects a function from functions list 322, previous settings list 324 may present the keys previously assigned to the selected function. The user may associate the selected function with the selected keys by selecting save settings button 326, which may be provided in key assigning menu 306. Alternately, the user may select "Use Default" button 328 to assign the function with the key or keys pre-determined by the trading system. For example, the bid function under "Key Tab 1" may be assigned a default key of "F7."

Finally, when the user has completed configuring alternative keyboard settings, the user may select "OK" button 330, "Cancel" button 332, and/or "Assign All Default Keys" button 334. "OK" button 330 and "Cancel" button 332 may be used to either confirm changes or cancel the changes selected in assign buttons menu 300, respectively. "Assign All Default Keys" button 334, if selected, cancels the changes selected in assign buttons menu 300 and assigns the default settings to the selected tab (e.g., tab 310, tab 312, tab 314, etc.).

One advantage of this feature is the multiple options provided to the user and the increase in overall flexibility.

In some embodiments, a user may be presented with a bids and offers display screen 500. Bids and offers display screen 500 may allow the user to view multiples bids and offers placed for an item. For example, display screen 500 shows that an item being traded is a 1 year U.S. Treasury Bond. A bid for twenty-five 1 year bonds at $101.25 was placed, while there is an offer for twenty 1 year bonds at $101.20.

Display screen 500 may also include a "What's Said" column 502. Instead of conventional combination arrow colors and directions representing the direction of the market, the user may be provided with "What's Said" column 502 that combines arrow colors and directions to represent whether a buyer or seller desires to transact.

Arrow 504 is a green arrow that points up, which may indicate that the offer price of the seller was paid and that the buyer desires to transact for a size greater than the offer size from the seller. For example, the color green may indicate that the buyer's bid size is greater than the offer size. That is, the buyer wishes to buy more bonds. Arrow 504 is pointing upward which may indicate that the offer price is paid. Alternately, arrow 506 is a green arrow that points down, which may indicate that the bid price of the buyer was given.

Display screen 500 shows arrows 508 and 510 as red arrows. The color red may indicate that the seller's offer size is greater than the buyer's bid size, thereby showing that the buyer wants to sell more of an item. Again, arrow 508 points up to indicate that the offer price was paid, while arrow 510 points down to indicate that the bid price was given.

Display screen 500 shows arrows 512 and 514 as yellow arrows. The color yellow may indicate that a buyer or a seller does not wish to make a transaction. Arrow 512 points up to indicate that a seller has placed an offer, however, there are no current bids. Arrow 514 points down to indicate that a buyer has placed a bid, however, there are no current offers.

It should be noted that any arrow color may be used. In some embodiments, display screen 500 may allow the user to select the color or other characteristic of the transaction. Although arrows are used in FIGS. 1-5, it should also be noted that any suitable visual indicator may be used.

In another suitable approach, the user may be provided with a bids and offers display screen 600 as shown in FIG. 6. Bids and offers display screen 600 may allow the user to view multiples bids and offers placed for an item. For example, display screen 600 shows that an item being traded is "NYM_F_CAL_02". Display screen 600 may also include, for example, selectable tabs corresponding to each market. As shown, the user has currently selected an "Energy" tab. In response, the user may be provided with bids and offers placed for items in an energy market.

As shown in FIG. 6, display screen 600 may comprise a variety of on-screen buttons and other suitable visual indicators. Generally, a button, as displayed in display screen 600, may be "pushed" or "selected" by placing a pointing device's pointer over the button and pressing a switch on the pointing device, as is commonly known in the art. The user may be provided with, for example, an expand button 602. In response to the user selecting button 602, the user may be provided with a detailed bids and offers display screen 700 as shown in FIG. 7. Providing the user with the ability to expand market rows may assist the user in viewing the depth of prices in the selected market.

Display screen 700 of FIG. 7 may include, for example, a list of bids and offers for an item. In some embodiments, display screen 700 may provide the user with selectable arrow buttons 702. Selectable arrow buttons 702 may allow the user to adjust existing orders. For example, selecting an up arrow may automatically increase the user's order by a predetermined amount (e.g., 0.50, 1.0, etc.). In response to the user selecting one of selectable arrow buttons 702, the user may be provided with a dialog window 800.

Figure 8:
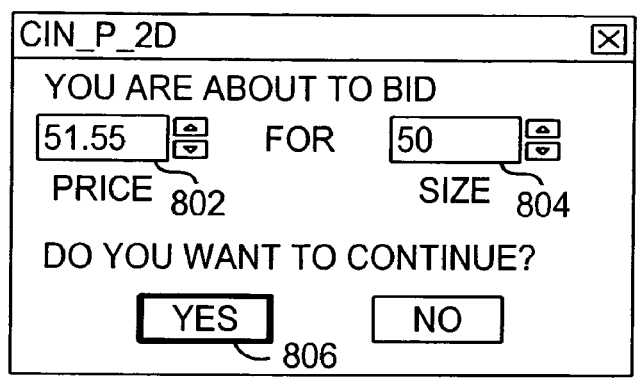
FIG. 8 is an illustrations of a dialog window that may be generated in accordance with certain embodiments of the present invention.

Dialog window 800 may prompt the user to confirm the modification to the user's existing order. For example, dialog window 800 may include a price 802 and a size 804. Dialog window 800 may also allow the user to modify the existing order. In response to the user confirming the modification, by, for example, selecting a "Yes" button 806, the modification to the existing order may be entered. In some embodiments, the user may disable the confirmation feature as shown in FIG. 8. For example, the user may disable dialog window 800 by modifying user preferences and deselecting the confirmation feature. In response to disabling the confirmation feature, the user may instantly modify existing orders by selecting one of selectable arrow buttons 702 (FIG. 7).

Referring back to FIG. 7, display screen 700 may also provide the user with column arrow buttons 704. In response to the user selecting one of column arrow buttons 704, all of the user's existing orders listed in display screen 700 may be modified. For example, in response to the user selecting a column up arrow, all of the user's existing orders may be increased by a predetermined amount (e.g., 0.5, 1.0, etc.).

Display screen 700 may also include, for example, buttons that change function depending on the state of the market. This feature is sometimes referred to herein as "Smart" buttons. For example, the user may be provided with smart buttons such as "Join" buttons 706 shown in display 700. "Join" buttons 706 may be the same as "Bid" or "Offer" buttons, however when a market is made button 706 may change its name to "Join" as this is now the appropriate action when multiple bids and offers are on display screen 700. "Join" buttons 706 may allow a user to join an existing bid or odder. In response to the user selecting one of "Join" buttons 706, the user may be provided with a dialog window, such as dialog window 800 of FIG. 8, to confirm or adjust the order before entering it into the market. Display screen 700 may also include "Bid" buttons 708 for placing bids, "Lift" buttons 710 for lifting existing offers, "Hit" buttons 712 for hitting existing bids, and "Offer" buttons 714 for placing offers.

Display 700 may allow the user to cancel an existing bid or offer. As shown in FIG. 7, the user may cancel a bid or offer by selecting an "X" button 716 corresponding to an existing bid or offer. In response, the corresponding bid or offer may be automatically cancelled. However, any other suitable approach may also be used. For example, the user may be provided with a cancel window (not shown) that prompts the user to confirm the cancellation of the selected bid or offer.

Display 700 may also allow the user to suspend existing bids or offers. For example, the user may suspend all existing bids by selecting a "Bid X" button 718. The user may suspend all orders by selecting an "Offer X" button 720. In response to the user selecting button 718 or button 720, the user may be provided with an active orders display screen 900 as shown in FIG. 9. FIG. 9 may provide the user with the ability to freely modify the suspended orders and/or restore the bids and offers to the market by, for example, choosing a button that signifies the appropriate action.

Active orders display screen 900 may include existing orders comprising one or more bids and/or offers made by the user. Display screen 900 may include selectable tabs, such as an "Active Orders" tab 902, a "Trade History" tab 904, a "Market History" tab 906, a "Suspended Markets" tab 908, and a "Status" tab 910. As shown, the user has currently selected "Suspended Markets" tab 908. In some embodiments, the user may automatically be provided with display 900 with "Suspended Markets" tab 908 in response to suspending a bid or offer. Under tab 908, the user may be provided with a list of suspended bids or offers. In response to the user selecting one of suspended bids or offers from display screen 900, the user may be provided with a dialog window 950. Dialog window 950 may, for example, allow the user to restore the selected bid or offer (e.g., by selecting a "Restore" button 952). Dialog window 950 may also provide the user with a "Price Up" button 954, a "Price Down" button 956, a "Size Up" button 958, and a "Size Down" button 960 to modify the selected bid or offer.

Display 900 may allow the user to cancel a suspended bid or offer. In response to the user, for example, selecting a suspended bid or offer with a pointing device (e.g., double-clicking with a mouse), the user may be provided with cancel window 1000. Window 1000 may prompt the user to cancel the suspended bid or offer. In response to the user selecting a "Yes" button from window 1000, the suspended bid or offer may be cancelled.

Although illustrated in a particular fashion for trading particular types of items, the present invention, and thus the interfaces shown in FIGS. 1-10, may be altered to facilitate trading of any type of tradable items. Additionally, although the illustrations above are discussed in connection with bidding for and buying of an item, persons skilled in the art will appreciate that the same features of the present invention are available in the offering for and selling of an item. Offer and sell buttons may be used instead of bid and buy buttons to offer and sell, respectively, an item.

Figure 11:
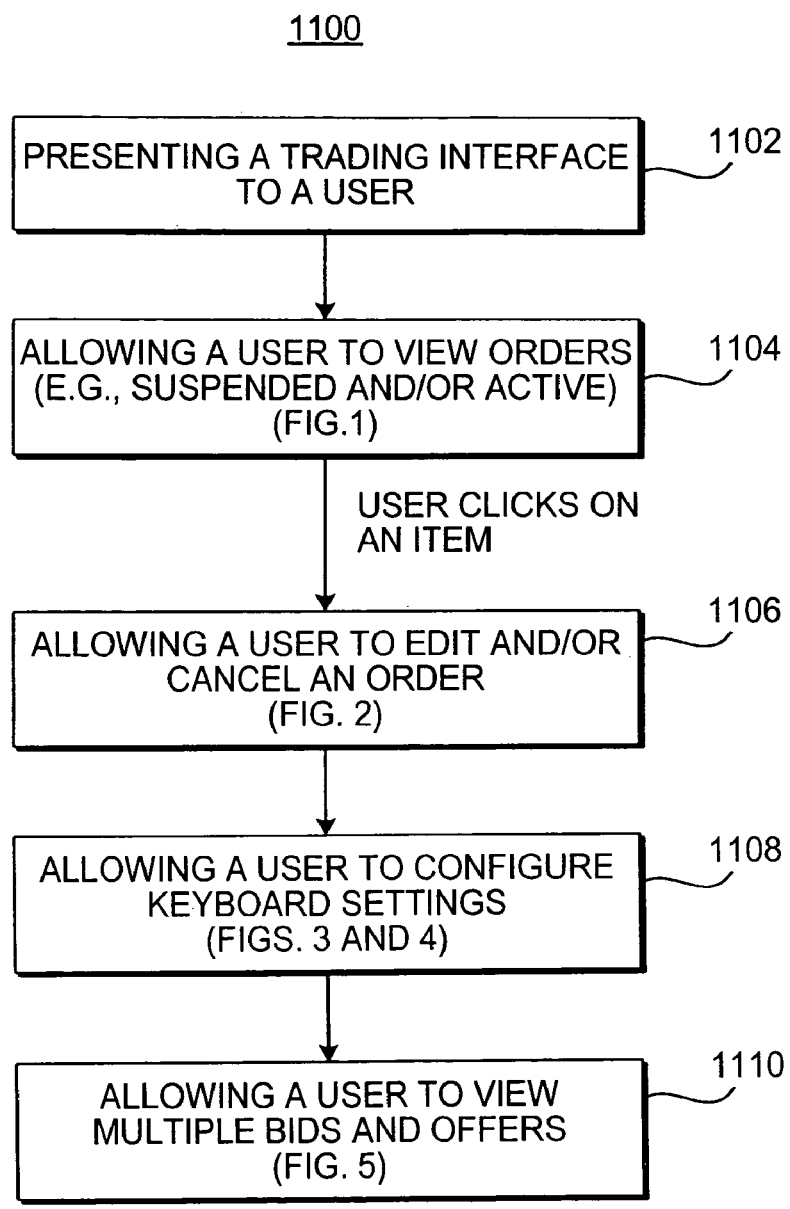
FIG. 11 is a flow diagram of a main process that may be used to perform the functions illustrated in FIGS. 1-10 in accordance with certain embodiments of the present invention.
Figure 12:
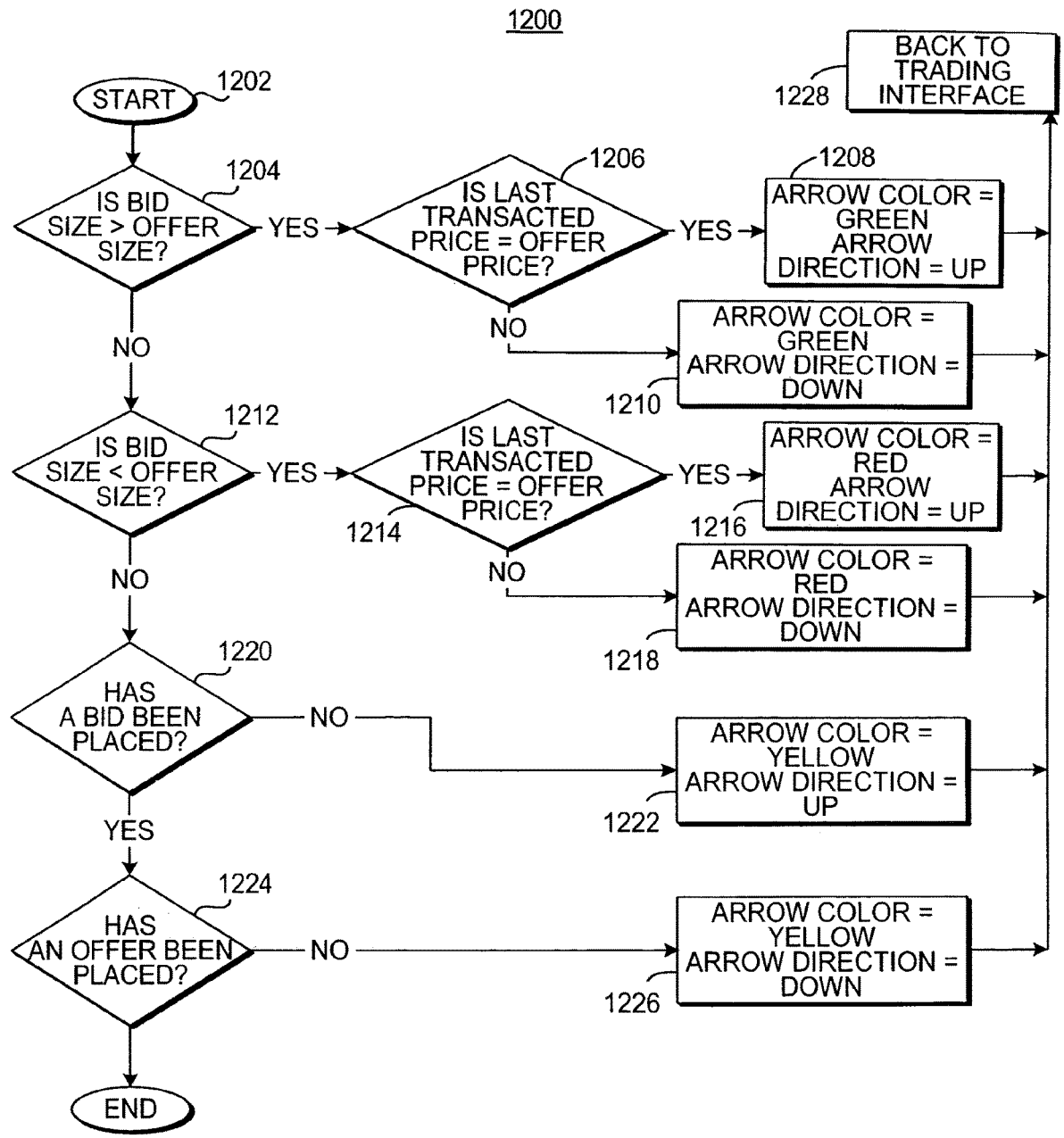
FIG. 12 is a flow diagram of a process that may be used to determine the additional information provided to the user in accordance with certain embodiments of the present invention.

One embodiment of a main process 1100 that may be used to control the presentation of the interfaces illustrated in FIGS. 1-10 is illustrated in FIG. 11. As shown in FIG. 11, process 1100 begins at step 1102 by presenting a trading interface to a user. Any suitable trading interface may be used (e.g., the trading summary display screen illustrated in FIG. 1). At step 1104, process 1100 may allow the user to view current bids and/or offers. For example, the user may be presented with a display screen that shows active and suspended bids as illustrated in FIG. 1.

At step 1106, process 1100 may allow a user to edit one or more bids, for example, by clicking on an item shown in the trading interface of FIG. 1. Once a user clicks on an item (e.g., a bid, an offer, etc.) in the trading interface, the user may be presented with a dialog window. The dialog window may allow the user to cancel, edit, and/or change the prices or sizes of the user's order.

If, at step 1108, process 1100 determines that the user pushed an assign buttons button, then process 1100 proceeds to present the user with an assign buttons window (as illustrated in FIGS. 3-4). Process 1100 allows the user to configure one or more alternative keyboard settings.

Once the user has completing creating or configuring keyboard settings, the user may be returned to the dialog window. When the user has completed editing or canceling an order for an item, process 1100 may proceed to close the dialog window. At step 1110, if the user edited or cancelled an order, process 1100 then allows the user to view multiple bids and offers by presenting the user with, for example, bids and offers display screens 500, 600, and 700 as shown in FIGS. 5-7, respectively. Bids and offers display screen 500 may include advanced features such as the "What's Said" column. The information shown in "What's Said" column may be determined by a process 1200.

Once a user has accessed a bid and offer display screen 500 or any other suitable trading interface at step 1202, process 1200 may allow the user to view one or more existing orders (e.g., bids, offers, etc.) This display may include bid price, bid size, offer price, offer size, and an arrow representing the buyers and sellers wish to transact.

To determine the color and direction associated with each arrow, process 1200 determines at step 1204 whether the bid size for an item is greater than the offer size. If the bid size is greater than the offer size, process 1200 determines at step 1206 whether the last transacted price is equivalent to the price offered by the seller. If the buyer bought the item at the seller's price, process 1200 then displays a green arrow that points in the up direction at step 1208. Otherwise, if the last transacted price is equivalent to the price offered by the buyer (e.g., bid price), process 1200 then displays a green arrow that points in the down direction at step 1210.

If the bid size is not greater than the offer size, process 1200 then determines whether the bid size is less than the offer size at step 1212. If the bid size is less than the offer size, process 1200 determines at step 714 whether the last transacted price is equivalent to the price offered by the seller. If the buyer bought the item at the seller's price, process 1200 then displays a red arrow that points in the up direction at step 1216. Otherwise, if the last transacted price is equivalent to the price offered by the buyer (e.g., bid price), process 1200 then displays a red arrow that points in the down direction at step 1218.

Process 1200 queries whether a bid or an offer has been placed at all. At step 1220, process 1200 determines if a bid has been placed. If a bid has not been placed for the item, process 1200 then displays a yellow arrow that points in the up direction at step 1222. The yellow color may indicate that the buyer has stopped making transactions. Otherwise, process 1200 then queries whether an offer has been placed at step 1224. If a bid has not been placed for the item, process 1200 then displays a yellow arrow that points in the down direction at step 1226. The additional information (e.g., arrow color and direction) may be transmitted to the trading interface at step 1228.

Figure 13:
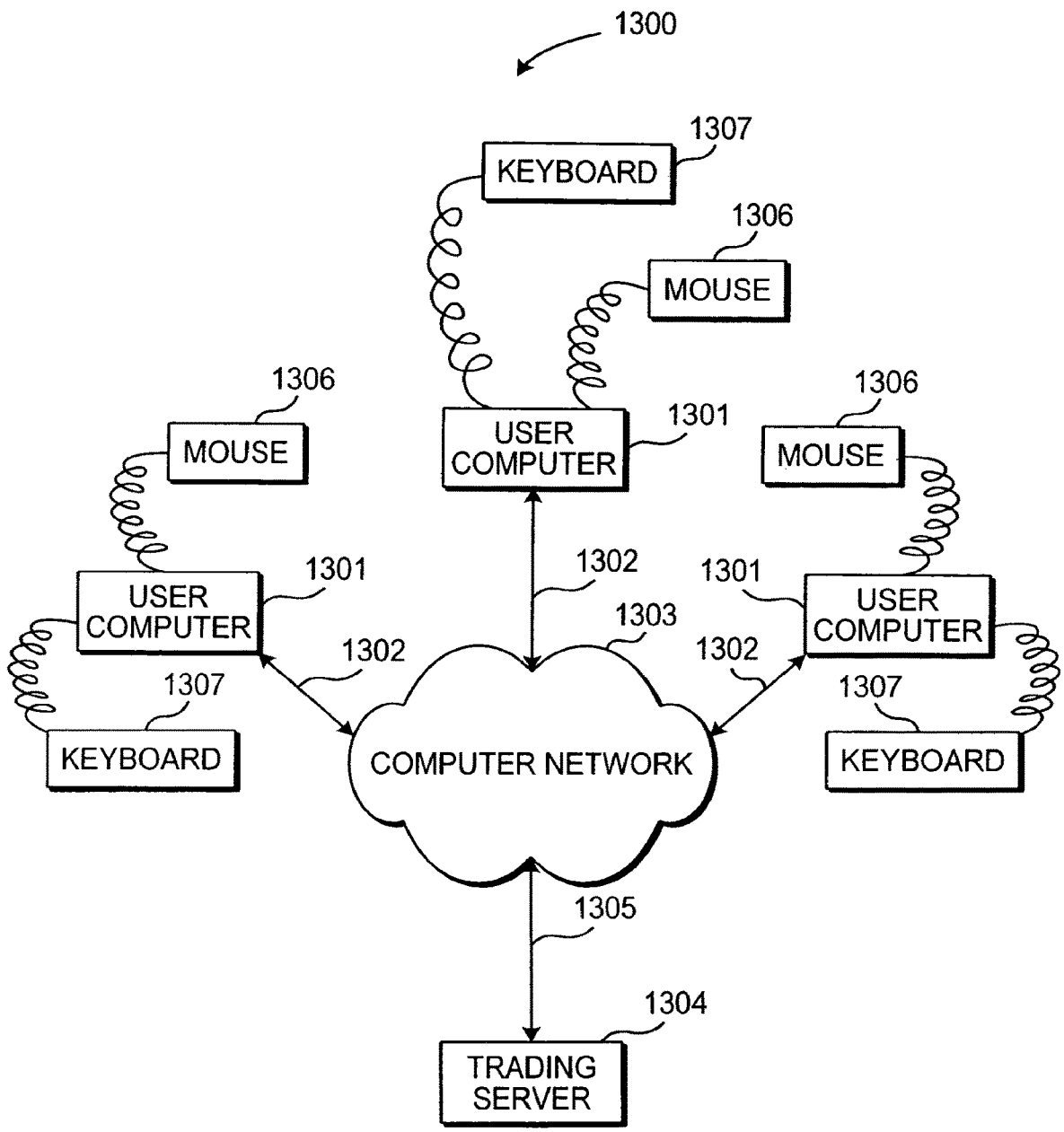
FIG. 13 is a block diagram of a trading system in accordance with certain embodiments of the present invention.

One example of a system 1300 for implementing the present invention is shown in FIG. 13. As illustrated, system 1300 may include one or more computers 1301, including a mouse 1306 and a keyboard 1307, that are connected by one or more communication links 1302 to a computer network 1303 that is linked via a communication link 1305 to a trading server 1304.

In system 1300, trading server 1304 may be any suitable server, processor, computer, or data processing device, or combination of the same. Computer network 1303 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 1302 and 1305 may be any suitable communication links suitable for communicating data between computers 1301 and server 1304, such as network links, dial-up links, wireless links, hard-wired links, etc. User computers 1301 may be any suitable computers, processors, computer terminals, displays, portable computers, personal digital assistants, or any other suitable data processing devices, or combinations of the same.

Thus, systems and methods for providing a trading interface with advanced features are provided. Providing a user with advanced features may allow the user to be more efficient and may provide the user with overall flexibility. Persons skilled in the art will appreciate that the present invention can be practiced by other than the described embodiments, which are presented for purposes of illustration and not of limitation, and the present invention is limited only by the claims which follow.

What is claimed is:

1. A method of communication in an electronic trading system over a communication network with interfaces of computing devices, the method comprising:
   detecting over a communication network in an electronic trading system a submission of a bid from a trading interface of a first computing device, wherein the submission comprises a price and a size;
   detecting over a communication network in an electronic trading system a submission of an offer from a trading interface of a second computing device, wherein the submission comprises a price and a size;
   causing to display a first indicator on a display interface of a computing device when the size of the bid from the first computing device is greater than the size of the offer from the second computing device, wherein the first indicator comprises a downward indicator when the transaction price is equivalent to a price of the bid, and wherein the first indicator comprises an upward indicator arrow when the transaction price is equivalent to a price of the offer;
   causing to display a second indicator on a display interface of a computing device when the size of the offer from the second computing device is greater than the size of the bid from the first computing device, wherein the second indicator comprises a downward indicator when the transaction price is equivalent to a price of the bid, and wherein the second indicator comprises an upward indicator when the transaction price is equivalent to a price of the offer;
   causing to display a third indicator on a display interface of a computing device when at least one bid and offer is not detected, wherein the third indicator comprises an upward indicator when at least one bid has not been detected, and wherein the third indicator comprises a downward indicator when at least one offer has not been detected;
   causing to display on a display interface a screen that includes a selectable assign button for assigning functions to one or more keys of a keyboard; and
   responsive to selecting the assign button, displaying to the display interface a screen for assigning functions to keys.

2. The method of claim 1,
   wherein the display screen for assigning functions to keys includes:
   a key menu that includes a list of selectable keys that correspond to respective keys of the keyboard,
   a function menu that includes a list of selectable functions, the list of selectable functions including bid, offer, buy, and sell, and
   a save button.

3. The method of claim 2, further comprising:
   receiving an indication of a selection from the list of selectable keys of the key menu a first one of the keys;
   receiving an indication of a selection from the list of selectable functions of the functions menu a first one of the functions;
   receiving an indication of a selection of the save button; and
   based at least in part on receiving the indication of a selection of the save button, configuring the key of the keyboard corresponding to the first key to perform the first function.

4. The method of claim 2, further comprising:
   receiving an indication of a selection from the list of selectable keys of the key menu a second one of the keys;
   receiving an indication of a selection from the list of selectable functions of the functions menu a second one of the function, in which the second key differs from the first key and the second function differs from the first function;
   receiving an indication of a selection of the save button; and
   based at least in part on receiving the indication of selection of the save button, configuring the key of the keyboard corresponding to the second key to perform the second function.

5. The method of claim 4, further comprising:
receiving an indication of a selection via the keyboard a key, the selected key being one of (i) the key corresponding to the first key and (ii) the key corresponding to the second key; and
based at least in part on receiving the indication of the selection via the keyboard a key, communicating via the communication network a trade command associated with one of the bid and the offer, the trade command corresponding to the function associated with the selected key of the keyboard.

6. The method of claim 5, further comprising:
causing to display to the display interface a screen for assigning functions to keys an indication that the key of the keyboard corresponding first key is configured to perform the first function and that the key of the keyboard corresponding second key is configured to perform the second function.

7. A system for communication in an electronic trading system over a communication network with interfaces of computing devices, the system comprising:
an electronic trading system configured to:
detect over a communication network in an electronic trading system a submission of a bid from a trading interface of a computing device of a first computing device, wherein the submission comprises a price and a size;
detect over a communication network in an electronic trading system a submission of an offer from a trading interface of a computing device of a second computing device, wherein the submission comprises a price and a size;
cause to cause to display a first indicator arrow on a display interface of a computing device when the size of the bid from the first computing device is greater than the size of the offer from the second computing device, wherein the first indicator comprises a downward indicator when the transaction price is equivalent to a price of the bid, and wherein the first indicator comprises an upward indicator when the transaction price is equivalent to a price of the offer;
cause to display a second indicator on a display interface of a computing device when the size of the offer from the second computing device is greater than the size of the bid from the first computing device, wherein the second indicator comprises a downward indicator when the transaction price is equivalent to a price of the bid, and wherein the second indicator comprises an upward indicator when the transaction price is equivalent to a price of the offer;
cause to display a third indicator on a display interface of a computing device when at least one bid and offer is not detected, wherein the third indicator comprises an upward indicator when at least one bid has not been detected, and wherein the third indicator comprises a downward indicator when at least one offer has not been detected;
cause to display on a display interface a screen that includes a selectable assign button for assigning functions to one or more keys of a keyboard; and
responsive to selecting the assign button, display to the display interface a screen for assigning functions to keys.

8. The system of claim 7,
wherein the display screen for assigning functions to keys includes:
a key menu that includes a list of selectable keys that correspond to respective keys of the keyboard,
a function menu that includes a list of selectable functions, the list of selectable functions including bid, offer, buy, and sell, and
a save button.

9. The system of claim 8, further comprising:
receive an indication of a selection from the list of selectable keys of the key menu a first one of the keys;
receive an indication of a selection from the list of selectable functions of the functions menu a first one of the functions;
receive an indication of a selection of the save button; and
based at least in part on receiving the indication of a selection of the save button, configure the key of the keyboard corresponding to the first key to perform the first function.

10. The system of claim 9, further comprising:
receive an indication of a selection from the list of selectable keys of the key menu a second one of the keys;
receive an indication selection from the list of selectable functions of the functions menu a second one of the function, in which the second key differs from the first key and the second function differs from the first function;
receive an indication of a selection of the save button; and
based at least in part on receiving the indication of selection of the save button, configure the key of the keyboard corresponding to the second key to perform the second function.

11. The system of claim 10, further comprising:
receive an indication of a selection via the keyboard a key, the selected key being one of (i) the key corresponding to the first key and (ii) the key corresponding to the second key; and
based at least in part on receiving the indication of the selection via the keyboard a key, communicate via the communication network a trade command associated with one of the bid and the offer, the trade command corresponding to the function associated with the selected key of the keyboard.

12. The system of claim 11, further comprising:
cause to display to the display interface a screen for assigning functions to keys an indication that the key of the keyboard corresponding first key is configured to perform the first function and that the key of the keyboard corresponding second key is configured to perform the second function.

13. A non-transitory computer storage-medium that stores instructions which, when executed by at least one processor, direct the at least one processor to:
detect over a communication network in an electronic trading system a submission of an offer from a trading interface of a computing device of a second computing device, wherein the submission comprises a price and a size;
cause to display a first indicator on a display interface of a computing device when the size of the bid from the first computing device is greater than the size of the offer from the second computing device, wherein the first indicator comprises a downward indicator when the transaction price is equivalent to a price of the bid, and wherein the first indicator comprises an upward indicator when the transaction price is equivalent to a price of the offer;

cause to display a second indicator on a display interface of a computing device when the size of the offer from the second computing device is greater than the size of the bid from the first computing device, wherein the second indicator comprises a downward indicator when the transaction price is equivalent to a price of the bid, and wherein the second indicator comprises an upward indicator when the transaction price is equivalent to a price of the offer;

cause to display a third indicator on a display interface of a computing device when at least one bid and offer is not detected, wherein the third indicator comprises an upward indicator when at least one bid has not been detected, and wherein the third indicator comprises a downward indicator when at least one offer has not been detected;

cause to display on a display interface a screen that includes a selectable assign button for assign functions to one or more keys of a keyboard; and responsive to selecting the assign button, display to the display interface a screen for assigning functions to keys.

14. The non-transitory computer storage-medium of claim 13,
wherein the display screen for assigning functions to keys includes:
a key menu that includes a list of selectable keys that correspond to respective keys of the keyboard,
a function menu that includes a list of selectable functions, the list of selectable functions including bid, offer, buy, and sell, and
a save button.

15. The non-transitory computer storage-medium of claim 14, wherein the instructions, when executed by at least one processor, further direct the at least one processor to:
receive an indication of a selection from the list of selectable keys of the key menu a first one of the keys;
receive an indication of a selection from the list of selectable functions of the functions menu a first one of the functions;
receive an indication of a selection of the save button; and
based at least in part on receiving the indication of a selection of the save button, configure the key of the keyboard corresponding to the first key to perform the first function.

16. The non-transitory computer storage-medium of claim 15, wherein the instructions, when executed by at least one processor, further direct the at least one processor to:
receive an indication of a selection from the list of selectable keys of the key menu a second one of the keys;
receive an indication selection from the list of selectable functions of the functions menu a second one of the function, in which the second key differs from the first key and the second function differs from the first function;
receive an indication of a selection of the save button; and
based at least in part on receiving the indication of selection of the save button, configure the key of the keyboard corresponding to the second key to perform the second function.

17. The non-transitory computer storage-medium of claim 16, wherein the instructions, when executed by at least one processor, further direct the at least one processor to:
receive an indication of a selection via the keyboard a key, the selected key being one of (i) the key corresponding to the first key and (ii) the key corresponding to the second key; and
based at least in part on receiving the indication of the selection via the keyboard a key, communicate via the communication network a trade command associated with one of the bid and the offer, the trade command corresponding to the function associated with the selected key of the keyboard.

18. The non-transitory computer storage-medium of claim 17, wherein the instructions, when executed by at least one processor, further direct the at least one processor to:
cause to display to the display interface a screen for assigning functions to keys an indication that the key of the keyboard corresponding first key is configured to perform the first function and that the key of the keyboard corresponding second key is configured to perform the second function.

19. The method of claim 1, wherein the first indicator comprises an arrow of a first color, the second indicator comprises an arrow of a second color, and the third indicator comprises an arrow of a third color.

20. The system of claim 7, wherein the first indicator comprises an arrow of a first color, the second indicator comprises an arrow of a second color, and the third indicator comprises an arrow of a third color.

* * * * *